(12) United States Patent
Yang et al.

(10) Patent No.: US 9,426,503 B2
(45) Date of Patent: Aug. 23, 2016

(54) MEDIA TYPE PROCESSING AND MEDIA PLAYING METHOD AND DEVICE IN IPTV SYSTEM

(71) Applicant: ZTE CORPORATION, Shenzhen (CN)

(72) Inventors: Jingang Yang, Shenzhen (CN); Rui Li, Shenzhen (CN); Bingliang Wu, Shenzhen (CN); Tianguang Jiao, Shenzhen (CN); Lei Zhao, Shenzhen (CN); Peng Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/422,024

(22) PCT Filed: Aug. 5, 2013

(86) PCT No.: PCT/CN2013/080835
§ 371 (c)(1),
(2) Date: Mar. 25, 2015

(87) PCT Pub. No.: WO2014/029268
PCT Pub. Date: Feb. 27, 2014

(65) Prior Publication Data
US 2015/0222937 A1    Aug. 6, 2015

(30) Foreign Application Priority Data

Aug. 24, 2012   (CN) .......................... 2012 1 0305226

(51) Int. Cl.
*G06F 13/00*     (2006.01)
*G06F 3/00*      (2006.01)
*H04N 5/445*     (2011.01)
(Continued)

(52) U.S. Cl.
CPC ..... *H04N 21/2353* (2013.01); *H04N 21/25833* (2013.01); *H04N 21/25858* (2013.01); *H04N 21/2665* (2013.01); *H04N 21/26283* (2013.01); *H04N 21/431* (2013.01);
(Continued)

(58) Field of Classification Search
USPC .............................................. 725/48–49, 109
See application file for complete search history.

(56) References Cited

U.S. PATENT DOCUMENTS

2006/0095410 A1    5/2006  Ostrover et al.
2011/0321094 A1*  12/2011  Kuo ...................... G06F 3/0481
                                                              725/40

FOREIGN PATENT DOCUMENTS

CN         101247510        8/2008
CN         102883192        1/2013
(Continued)

*Primary Examiner* — Hunter B Lonsberry
(74) *Attorney, Agent, or Firm* — Pearl Cohen Zedek Latzer Baratz LLP

(57) ABSTRACT

A media type processing method and apparatus, a media playing method and an EPG subsystem in an IPTV system are provided. The processing method and the media playing method comprise: defining a media type set; an SMS subsystem mapping all media types supported by programs or channels into the media type set, and issuing to an EPG subsystem; mapping the media types supported by a terminal as the media type set; after the authentication is passed, the SMS subsystem returning the media type set supported by the terminal to the EPG subsystem; and after the EPG subsystem receives a media playing request from the terminal, judging whether the media type set supported by the terminal is matched with the media type set supported by the programs or channels, and if being matched, acquiring information about the playable physical program from a database and issuing to the terminal for playing.

16 Claims, 3 Drawing Sheets

| (51) | Int. Cl. | |
|---|---|---|
| | H04N 21/235 | (2011.01) |
| | H04N 21/2665 | (2011.01) |
| | H04N 21/431 | (2011.01) |
| | H04N 21/643 | (2011.01) |
| | H04N 21/84 | (2011.01) |
| | H04N 21/45 | (2011.01) |
| | H04N 21/258 | (2011.01) |
| | H04N 21/262 | (2011.01) |
| | H04N 21/266 | (2011.01) |

(52) U.S. Cl.
CPC .... *H04N 21/4516* (2013.01); *H04N 21/64322* (2013.01); *H04N 21/84* (2013.01); *H04N 21/266* (2013.01)

(56) References Cited

FOREIGN PATENT DOCUMENTS

| WO | WO 2008/042242 | 4/2008 |
|---|---|---|
| WO | WO 2012/040385 | 3/2012 |

\* cited by examiner

MEDIA TYPE PROCESSING AND MEDIA PLAYING METHOD AND DEVICE IN IPTV SYSTEM

CROSS-REFERENCE TO RELATED APPLICATIONS

This application is a National Phase Application of PCT International Application No. PCT/CN2013/080835, entitled "MEDIA TYPE PROCESSING AND MEDIA PLAYING METHOD AND DEVICE IN IPTV SYSTEM", International Filing Date Aug. 5, 2013, published on Feb. 27, 2014 as International Publication No. WO 2014/029268, which in turn claims priority from Chinese Patent Application No. 201210305226.3, filed Aug. 24, 2012, all of which are incorporated herein by reference in their entirety.

TECHNICAL FIELD

The present document relates to the communication field, and in particular, to a media type processing method and apparatus in an Internet Protocol Television (IPTV) system, and a media playing method and an Electronic Program Guide (EPG) server in the IPTV system based on that processing method.

BACKGROUND

The IPTV incorporates many kinds of technologies, such as, Internet, multimedia, communication, etc., into an organic whole, uses the personal computer or television+set top box as the display terminal, and provides the broadband services, such as, the digital broadcast television, the video service, the information service, the interaction community, the interaction entertainment, the E-commerce, etc., for the user through the broadband network.

In recent years, along with the constant expanding of the IPTV service and the constant enriching of the content, the access terminal is no longer limited to the personal computer and the set top box as well, and the tablet computer and the mobile phone become increasingly popular access terminals as well. However, the media types supported by different terminal types are different, and the media types supported by the terminals of different manufacturers with the same type are also different. In addition, the media types supported by various programs/channels in the IPTV system are different because of the difference of the encoder modes. How to manage these various media type data and how to associate with the original services of the IPTV system are both problems to be solved at present urgently.

SUMMARY

The present document provides a media type processing method and apparatus in the IPTV system, and a media playing method and an EPG subsystem in the IPTV system based on the processing method, to meet the continuously increasing demand of the multi-screen service of the IPTV system to the media diversity and ensure the expansibility and processing performance of the subsequence service at the same time.

In order to solve the above-mentioned technical problem, the present document provides a media type processing method in an Internet Protocol Television (IPTV) system, comprising:

defining a media type set; wherein, the media type set comprises a combination of one or more media types;

a service management system (SMS) subsystem acquiring media types supported by programs or channels, mapping the acquired media types into a media type set supported by the programs or the channels, storing the media type set supported by the programs or the channels into a metadata field of a program channel media type set, and issuing the media type set supported by the programs or the channels to an Electronic Program Guide (EPG) subsystem; and the SMS subsystem acquiring the media types supported by a terminal, mapping the acquired media types into the media type set supported by the terminal, storing the media type set supported by the terminal into a metadata field of a terminal media type set, and establishing a corresponding relationship between the media type set supported by the terminal and a user account.

The step of the SMS subsystem acquiring media types supported by programs or channels and mapping the acquired media types into a media type set supported by the programs or the channels comprises:

when establishing a program or channel locally, the SMS subsystem selecting a media type supported by this program or channel, or, the SMS subsystem receiving the media type supported by the program or the channel issued by a third party; and mapping the media type supported by each program or channel as an element of the media type set when mapping the acquired media type into the media type set supported by the program or the channel.

The step of the SMS subsystem acquiring the media types supported by a terminal and mapping the acquired media types into the media type set supported by the terminal comprises:

the SMS subsystem recording a media type supported by a terminal selected by a user when the user registers an account, or, the SMS subsystem receiving the media type supported by the terminal from the third party; and mapping the media type supported by each terminal as an element of the media type set when mapping the acquired media type into the media type set supported by the terminal.

The step of storing the media type set supported by the programs or the channels into a metadata field of a program channel media type set comprises:

storing the media type set supported by the programs or the channels into the metadata field of the program channel media type set by a binary mode, wherein, each binary represents one media type, a value as 1 represents that the program or the channel supports the media type, and a value as 0 represents that the program or the channel does not support the media type;

the step of storing the media type set supported by the terminal into a metadata field of a terminal media type set comprises:

storing the media type set supported by the terminal into the metadata field of the terminal media type set by a binary mode, wherein, each binary represents one media type, a value as 1 represents that the terminal supports the media type, and a value as 0 represents that the terminal does not support the media type.

The present document further provides a media playing method in an Internet Protocol Television (IPTV) system based on the above-mentioned processing method, comprising:

after an authentication to a terminal by a service management system (SMS) subsystem is passed, the SMS subsystem returning a stored media type set supported by the terminal to an Electronic Program Guide (EPG) subsystem; and after the EPG subsystem receives a media playing request from the terminal, judging whether the media type set supported by the terminal is matched with the media type set, which is issued by the SMS subsystem, supported by the programs or channels, and if being matched, then acquiring information about a playable physical program from a database and issuing to the terminal for playing.

The method further comprises:

the EPG subsystem, after receiving the media type set supported by the terminal which is returned by the SMS subsystem, storing the media type set supported by the terminal in conversation information, and storing the media type set supported by the program or the channel which is issued by the SMS subsystem in the database;

the step of the EPG subsystem acquiring the information about the playable physical program from the database and issuing to the terminal for playing comprises:

the EPG subsystem taking out the media type set supported by the terminal from the conversation information, and searching for the media type set supported by the program or the channel in the database, performing logic AND calculation to the media type set supported by the terminal and the media type set supported by the program or the channel, and then acquiring information about a playable media from the database if there is an intersection between the two, and assembling a playing address and issuing to the terminal for playing.

The step of returning the stored media type set supported by the terminal to the EPG subsystem after the authentication to the terminal by the SMS subsystem is passed comprises:

the SMS subsystem returning the media type set supported by the terminal corresponding to a user account of the terminal to the EPG subsystem according to the user account of the terminal after the authentication to the terminal is passed.

The present document further provides a media type processing apparatus in an Internet Protocol Television (IPTV) system, comprising:

a media type set definition module, configured to: define a media type set; wherein, the media type set comprises a combination of one or more media types;

a program or channel media type processing module, configured to: acquire media types supported by programs or channels, map the acquired media types into a media type set supported by the programs or the channels, store the media type set supported by the programs or the channels into a metadata field of a program channel media type set, and issue the media type set supported by the programs or the channels to an Electronic Program Guide (EPG) subsystem; and a terminal media type processing module, configured to: acquire the media types supported by a terminal, map the acquired media types into the media type set supported by the terminal, store the media type set supported by the terminal into a metadata field of a terminal media type set, and establish a corresponding relationship between the media type set supported by the terminal and a user account.

The program or channel media type processing module is configured to acquire media types supported by programs or channels and map the acquired media types into a media type set supported by the programs or the channels by the following mode:

selecting a media type supported by a program or a channel when establishing the program or the channel locally, or, receiving the media type supported by the program or the channel issued by a third party; and mapping the media type supported by each program or channel as an element of the media type set when mapping the acquired media type into the media type set supported by the program or the channel.

The terminal media type processing module is configured to acquire the media types supported by a terminal and map the acquired media types into the media type set supported by the terminal by the following mode:

recording a media type supported by a terminal selected by a user when the user registers an account, or, receiving the media type supported by the terminal from the third party; and mapping the media type supported by each terminal as an element of the media type set when mapping the acquired media type into the media type set supported by the terminal.

The program or channel media type processing mode is configured to: store the media type set supported by the programs or the channels into the metadata field of the program channel media type set by a binary mode, wherein, each binary bit represents one media type, a value as 1 represents that the program or the channel supports the media type, and a value as 0 represents that the program or the channel does not support the media type;

the terminal media type processing mode is configured to: store the media type set supported by the terminal into the metadata field of the terminal media type set by a binary mode, wherein, each binary bit represents one media type, a value as 1 represents that the terminal supports the media type, and a value as 0 represents that the terminal does not support the media type.

The present document further provides an Electronic Program Guide (EPG) subsystem of a terminal playing media in an Internet Protocol Television (IPTV) system based on the above-mentioned processing apparatus, comprising:

a terminal media type set acquiring module, configured to: after an authentication request of a terminal is received and the terminal passes an authentication by a service management system (SMS) subsystem, receive a media type set supported by the terminal which is returned by the SMS subsystem; and a playable media inquiry module, configured to: after receiving a media playing request of the terminal, judge whether the media type set supported by the terminal is matched with the media type set, which is issued by the SMS subsystem, supported by the programs or channels, and if being matched, then acquire information about a playable physical program from a database and issue to the terminal for playing.

The EPG subsystem further comprises:

a control module, configured to: after receiving the media type set supported by the terminal which is returned by the SMS subsystem, store the media type set supported by the terminal in conversation information, and store the media type set supported by the program or the channel which is issued by the SMS subsystem in the database;

the playable media inquiry module is configured to acquire the information about the playable physical program from the database and issue to the terminal for playing by the following mode:

taking out the media type set supported by the terminal from the conversation information, and searching for the media type set supported by the program or the channel in the database, performing logic AND calculation to the media type set supported by the terminal and the media type set supported by the program or the channel, and then acquiring the information about a playable media from the database if there is an intersection between the two, and assembling a playing address and issuing to the terminal for playing.

As to the related art, the media type processing method and apparatus in the IPTV system, and the media playing method and the EPG subsystem in the IPTV system based on the processing method provided in the embodiments of the present document conclude the media types to form the media type set, integrate the discrete metadata information of the program, the channel or the terminal into one data information, and can meet the continuously increasing demand of the multi-screen service of the IPTV system to the media diversity; and store the media type set by adopting the binary mode and strengthen the processing performance on the basis of strengthening the expansibility.

PREFERRED EMBODIMENTS OF THE PRESENT DOCUMENT

The embodiment of the present document is described in detail with reference to the accompanying drawings hereinafter. It should be illustrated that, in the case of not conflicting, the embodiments in the present application and features in these embodiments can be combined with each other.

Embodiment

Figure 1:
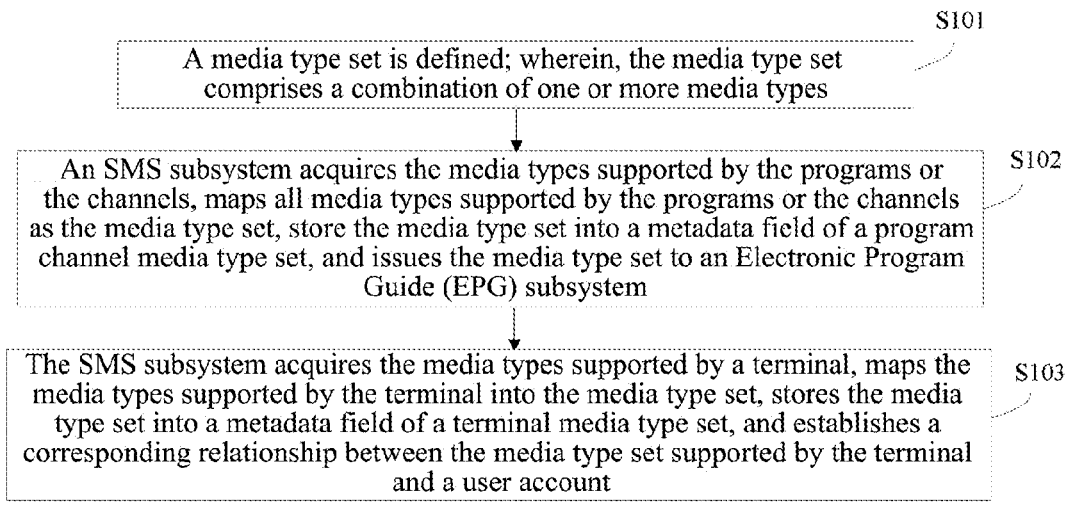
FIG. 1 is a flow chart of a media type processing method in an IPTV system in an embodiment.

As shown in FIG. 1, the present embodiment provides a media type processing method in an Internet Protocol Television (IPTV) system, including the following steps.

In S101, a media type set is defined; wherein, the media type set comprises a combination of one or more media types;

For example, the common media types in the IPTV system are the Real Time Streaming Protocol (RTSP), the HTTP Live Streaming (HLS), the Silverlight, etc. In consideration of various common media types and the subsequent expansibility, the concept of the media type set is proposed. The media type set is {1:RTSP; 2:HLS; 3:RTSP&HLS; 4:Silverlight; 5:RTSP&Silverlight; 6:HLS &Silverlight; 7:RTSP&HLS&Silverlight}, and different programs, channels or terminals support one or more therein according to the difference of the realization technology.

In S102, a service management system (SMS) subsystem acquires the media types supported by the programs or the channels, maps all media types supported by the programs or the channels into the media type set, store the media type set into a metadata field of a program channel media type set, and issues the media type set to an Electronic Program Guide (EPG) subsystem.

Wherein, the programs include, such as, the Video On Demand (VOD) or the True Video On Demand (TVOD), etc., and the channels include, such as, the LIVETV, etc.

In S103, the SMS subsystem acquires the media types supported by a terminal, maps the media types supported by the terminal into the media type set, stores this media type set into a metadata field of a terminal media type set, and establishes a corresponding relationship between the media type set supported by the terminal and a user account.

Inside the original program or channel information, there is one field supporting various media types respectively, and there is one field supporting the set top box/mobile phone/pad respectively, for example: STB_ENABLE/PHONE_ENABLE/PAD_ENABLE. In the step S102 and S103 of the present embodiment, all fields of the media types supported by the programs or channels are organized into one field "metadata field of a program channel media type set", and all fields of the media types supported by the terminal are organized into one field "metadata field of a terminal media type set". In this way, the discrete metadata information of the program, the channel and the terminal can be integrated in one data information.

Wherein, the media type sets are stored into the metadata field of the program channel media type set or into the metadata field of the terminal media type set by a binary mode, and each binary represents one media type. If the program, the channel or the terminal supports the media type, then the corresponding binary bit is represented as 1; or else, as 0.

Figure 3:
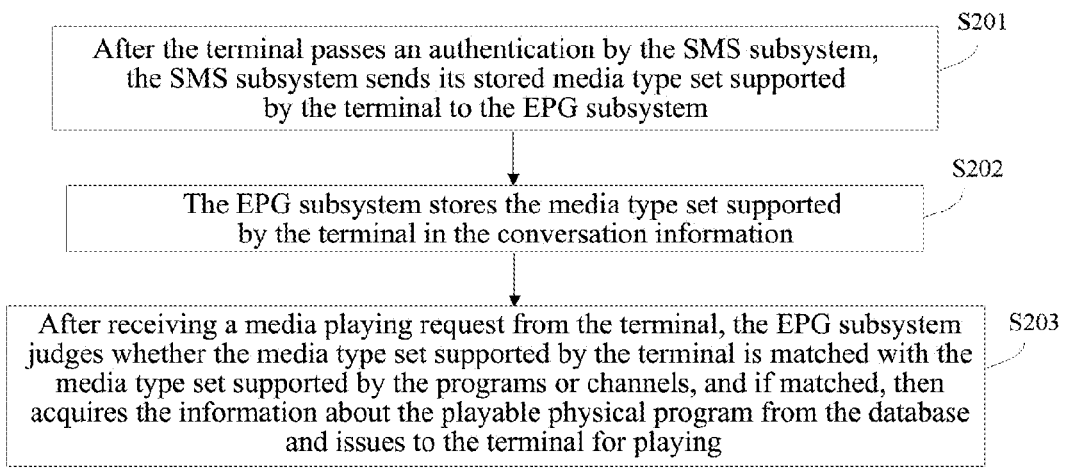
FIG. 3 is a flow chart of a media playing method in an IPTV system based on the above-mentioned processing method in an embodiment.

For example: in an application example, in order to be easy to calculate and store, the media type supported by the program is represented with 4 bytes, 32 binary bits (which can be extended as required). As shown in FIG. 3, the last binary bit represents the RTSP, the penultimate bit represents the Silverlight, and the antepenultimate bit represents the HLS; it is represented as 1 when the media type is supported, and represented as 0 when the media type is not supported, such as the program:

1), the "Avatar" supports the HLS/RTSP, and the binary is shown as the following table, then the metadata field value is 5.

| 0 | 0 | 0 | 0 | 0 | ... | ... | 1 | 0 | 1 |

2), the "LiangJian" only supports the Silverlight, and the binary is shown as the following table, then the metadata field value is 2.

| 0 | 0 | 0 | 0 | 0 | ... | ... | 0 | 1 | 0 |

The SMS subsystem stores the above-mentioned media type sets supported by the program or the channel and the terminal in its service database, and the service database converts the binary into the decimal for storage. For example, the 32 bit binary is stored by adopting the int type, and the 64 bit is stored by adopting the long type.

In step 102, the SMS subsystem acquiring the media type supported by the program or the channel includes two kinds of situations: establishing the program or the channel locally, or the media type of the program or the channel being from the third party content provider, such as, the culture broadcasting, the broadcasting and TV, the CCTV, etc.

The operations of the SMS subsystem acquiring the media types supported by the programs or the channels and mapping all media types supported by the programs or the channels into the media type set include:

the SMS subsystem selecting the media type supported by the program or the channel when establishing the program or the channel locally, or, the SMS subsystem receiving the media type supported by the program or the channel issued by the third party; and mapping the media type supported by each program or channel as an element of the media type set when mapping the media types supported by all the programs or the channels into the media type set.

In step 103, the SMS subsystem acquiring the media type supported by the terminal also includes two kinds of situations: one is to establish the terminal on the SMS directly, and the other is that the SMS system acquires the media type supported by the terminal from the third party BOSS interface machine.

The SMS subsystem acquiring the media types supported by the terminal and maps the media types supported by the terminal into the media type set includes:

the SMS subsystem recording the media type data supported by the terminal selected by the user when the user registers an account, or, the SMS subsystem acquiring the media type data supported by the terminal from the third party; and mapping the media type supported by each terminal as an element of the media type set when mapping the media types supported by the terminal into the media type set.

In step 103, the SMS subsystem establishing the corresponding relation between the media type set supported by the terminal and the user account includes:

when the user registers the account, the SMS subsystem establishing the corresponding relation between the media type set supported by the terminal and the user account;

or, while the SMS subsystem acquires the media type supported by the terminal from the third party, acquiring the registered account information of the terminal in the third party, and establishing corresponding relation between the media type set supported by the terminal and the registered account information of the terminal in the third party.

Figure 2:
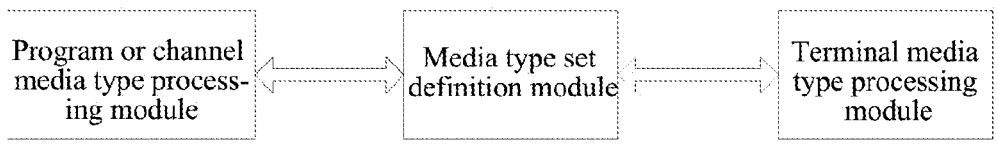
FIG. 2 is a structure diagram of a media type processing apparatus in an IPTV system in an embodiment.

As shown in FIG. 2, the present embodiment provides a media type processing apparatus in an Internet Protocol Television (IPTV) system, including the following modules.

A media type set definition module is configured to: define a media type set; wherein, the media type set comprises a combination of one or more media types.

Wherein, the program, the channel or the terminal supports one or more in the media type set.

A program or channel media type processing module is configured to: acquire media types supported by programs or channels, map all media types supported by the programs or the channels as the media type set, store the media type set into a metadata field of a program channel media type set, and issue the media type set to an Electronic Program Guide (EPG) subsystem.

Wherein, the program or channel media type processing module is configured to acquire media types supported by programs or channels and map all media types supported by the programs or the channels as the media type set by the following mode:

selecting a media type supported by a program or a channel when establishing the program or the channel locally, or, receiving the media type supported by the program or the channel issued by a third party; and mapping all media types supported by the programs or the channels as the media type, wherein, the media type supported by each program or channel is mapped as an element of the media type set.

A terminal media type processing module is configured to: acquire the media types supported by the terminal, map the media types into the media type set, store the media type set into a metadata field of a terminal media type set, and establish a corresponding relationship between the media type set supported by the terminal and a user account.

Wherein, the terminal media type processing module is configured to acquire the media types supported by the terminal and map the media types supported by the terminal into the media type set by the following mode:

recording a media type supported by a terminal selected by a user when the user registers an account, or, receiving the media type supported by the terminal from the third party; and mapping the media types supported by the terminal as the media type set, wherein, the media type supported by each terminal is mapped as an element of the media type set.

Wherein, the media type sets are stored into the metadata field of the program channel media type set or into the metadata field of the terminal media type set by a binary mode, and each binary represents one media type. If the program, the channel or the terminal supports the media type, then the corresponding binary bit is represented as 1; or else, as 0.

As shown in FIG. 3, the present embodiment provides a media playing method in an IPTV system based on the above-mentioned processing method, including the following steps.

In S201, after an authentication to the terminal by the SMS subsystem is passed, the media type set supported by the terminal stored by the SMS subsystem is returned to the EPG subsystem.

Wherein, the SMS subsystem searches its service database for the media type set corresponding to the user account according to the user account of the terminal, and returns the media type set supported by the terminal corresponding to the user account of the terminal to the EPG subsystem after the terminal passed the authentication.

In S202, the EPG subsystem stores the media type set supported by the terminal in the conversation information.

Wherein, the EPG subsystem stores the media type set supported by the program or the channel into its database after the SMS subsystem issues the media type set supported by the program or the channel to the EPG subsystem.

In S203, after receiving a media playing request from the terminal, the EPG subsystem judges whether the media type set supported by the terminal is matched with the media type set supported by the programs or channels, and if being matched, then acquires the information about the playable physical program from the database and issues to the terminal for playing.

Wherein, when acquiring the information about the playable media from the database, the EPG subsystem takes out the media type set supported by the terminal from the conversation information, and searches for the media type set supported by the program or the channel in the database, performs logic AND calculation on the media type set supported by the terminal and the media type set supported by the program or the channel by adopting the "AND" operation, that is, assumes that the program media type set is A and the media type set supported by the terminal is B, then the algorithm of judging whether the terminal supports the program playing is A&B; and then acquires the information about the playable media from the database if there is an intersection between the two, and assembles a playing address and issues to the terminal for playing.

Figure 4:
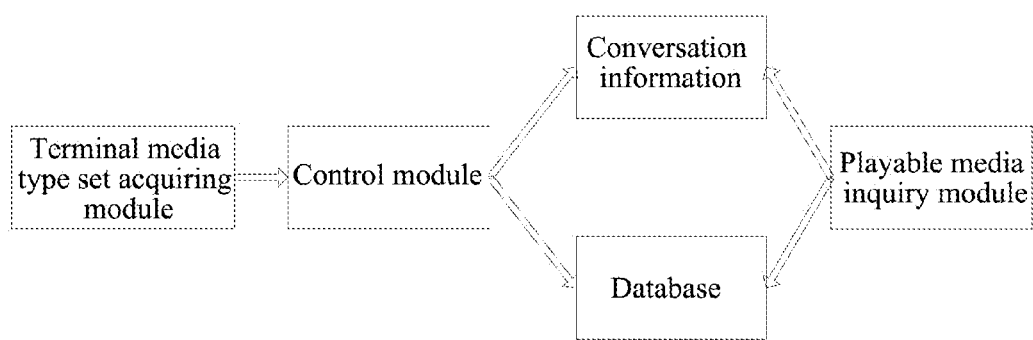
FIG. 4 is a structure diagram of an EPG subsystem in an IPTV system in an embodiment.

As shown in FIG. 4, the present embodiment provides an EPG subsystem in an IPTV system based on the above-mentioned processing apparatus, including the following modules.

A terminal media type set acquiring module is configured to: after an authentication request of a terminal is received and the terminal passes the authentication of the SMS subsystem, receive a media type set supported by the terminal which is returned by the SMS subsystem.

A control module is configured to: after receiving the media type set supported by the terminal which is returned by the SMS subsystem, store the media type set supported by the terminal in the conversation information, and store the media type set supported by the program or the channel which is issued by the SMS subsystem in the database.

A playable media inquiry module is configured to: after receiving a media playing request of the terminal, judge whether the media type set supported by the terminal is matched with the media type set supported by the programs or channels, and if being matched, then acquire the information about the playable physical program from the database and issue to the terminal for playing.

Wherein, the playable media inquiry module is configured to take out the media type set supported by the terminal from the conversation information, and search for the media type set supported by the program or the channel in the database, perform logic AND calculation to the media type set supported by the terminal and the media type set supported by the program or the channel, and then acquire the information about the playable media from the database if there is an intersection between the two, and assemble a playing address and issue to the terminal for playing.

Figure 5:
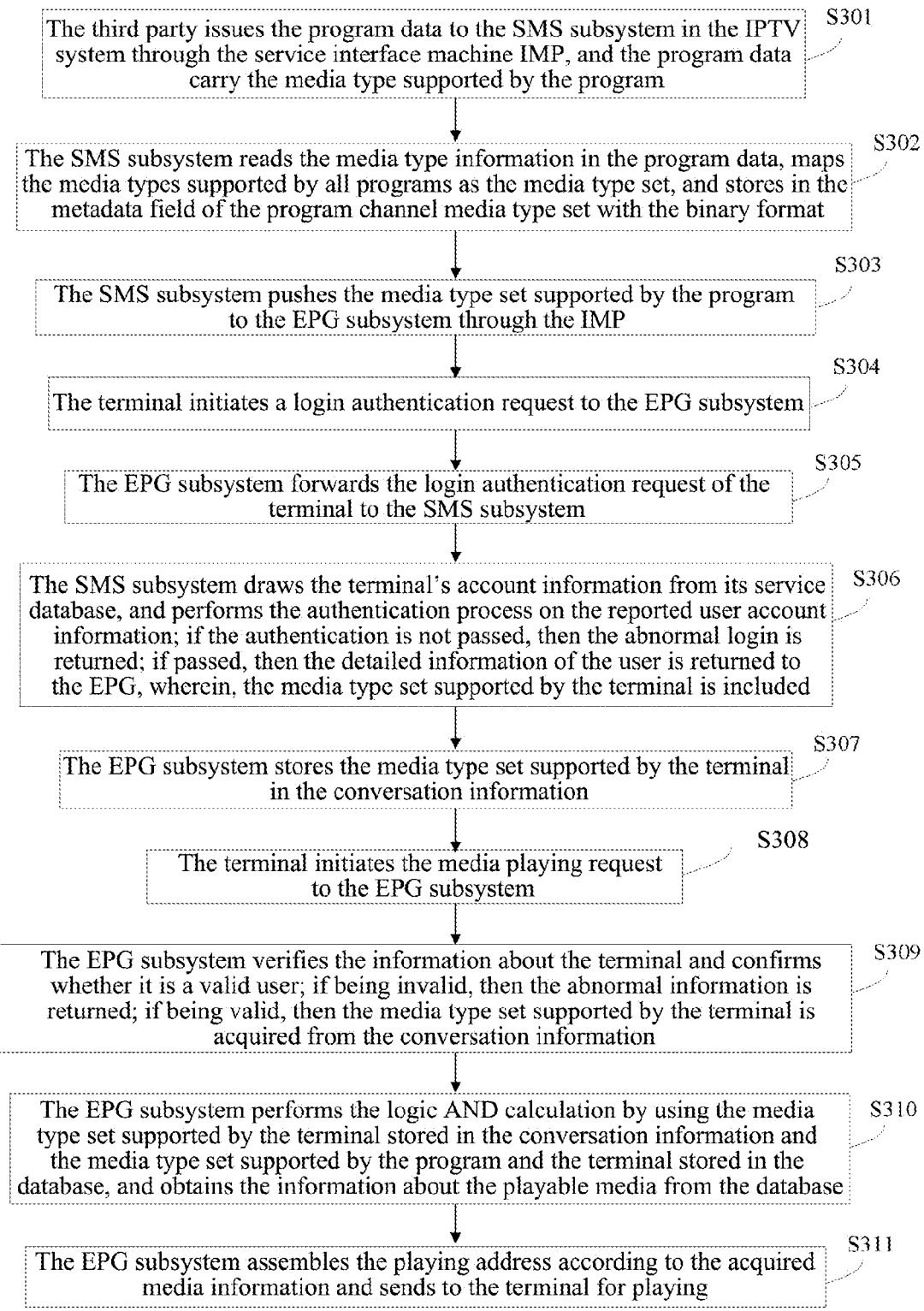
FIG. 5 is a flow chart of a media playing method in an IPTV system in an application example.

In an application example, taking that the SMS subsystem receives the media type supported by the program from the third party as an example, as shown FIG. 5, the media playing method in the IPTV system includes the following steps.

In S301: the third party issues the program data to the SMS subsystem in the IPTV system through the service interface machine IMP, and the program data carry the media type supported by the program.

In addition, the SMS subsystem also performs the data connection with the third party periodically, and the third party will send the data, such as, the account of the user and what service is selected when the user opens the account, etc., to SMS subsystem, therefore, the SMS subsystem can obtain the account information of the terminal when the registration is made in the third party.

Because the media types of the program data issued by the third party are dispersed, the SMS subsystem is required to draw these media types, and then the media type set is generated according to the mode of the present document.

In S302: the SMS subsystem of the IPTV system reads the media type information in the program data, maps the media types supported by all programs into the media type set, and stores in the metadata field of the program channel media type set in the binary format.

In S303: the SMS subsystem pushes the media type set supported by the program down to the EPG subsystem through the IMP.

Wherein, the EPG subsystem stores the media type set supported by the program in its database.

In S304: the terminal initiates a login authentication request to the EPG subsystem.

In S305: the EPG subsystem forwards the login authentication request of the terminal to the SMS subsystem.

In S306: the SMS subsystem draws the terminal account information from its service database, and performs the authentication process to the reported user account information; if the authentication is not passed, then the abnormal login is returned; if being passed, then the detailed information of the user is returned to the EPG, wherein, the media type set supported by the terminal is included.

In S307: the EPG subsystem stores the media type set supported by the terminal in the conversation information.

In S308: the terminal initiates the media playing request to the EPG subsystem.

In S309: the EPG subsystem verifies the terminal information and confirms whether it is a valid user; if being invalid, then the abnormal information is returned; if being valid, then the media type set supported by the terminal is acquired from the conversation information.

In S310: the EPG subsystem performs the logic AND calculation by using the media type set supported by the terminal stored in the conversation information and the media type set supported by the program stored in the database, and acquires the information about the playable media from the database.

In S311: the EPG subsystem assembles the playing address according to the acquired media information and sends to the terminal for playing.

It can be seen from the above-mentioned embodiments that, as to the related art, the media type processing method and apparatus in the IPTV system, and the media playing method and the EPG subsystem in the IPTV system based on the processing method provided in the above-mentioned embodiments conclude the media types to form the media type set, integrate the discrete metadata information into one data information, and can meet continuously increasing demand of the multi-screen service of the IPTV system to the media diversity; and store the media type set by adopting the binary mode and strengthen the processing performance on the basis of strengthening the expansibility.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above description is only the preferred embodiments of the present document and is not intended to limit the protection scope of the present document. The present document can have a variety of other embodiments according to the content of the document. Those skilled in the art can make the corresponding modifications and variations according to the present document without departing from the spirit and essence of the present document. All of modifications, equivalents and/or variations without departing from the spirit and essence of the present document should be embodied in the scope of the appending claims of the present document.

INDUSTRIAL APPLICABILITY

As to the related art, the media type processing method and apparatus in the IPTV system, and the media playing method and the EPG subsystem in the IPTV system based on the processing method provided in the embodiments of the present document conclude the media types to form the media type set, integrate the discrete metadata information of the program, the channel or the terminal into one data information, and can meet the continuously increasing demand of the multi-screen service of the IPTV system to the media diversity; and store the media type set by adopting the binary mode and strengthen the processing performance on the basis of strengthening the expansibility.

What we claim is:

1. A media type processing method in an Internet Protocol Television (IPTV) system, comprising:
   defining a media type set, wherein, the media type set comprises a combination of one or more media types;

a service management system (SMS) subsystem acquiring media types supported by programs or channels, mapping the acquired media types into a media type set supported by the programs or the channels, storing the media type set supported by the programs or the channels into a metadata field of a program channel media type set, and issuing the media type set supported by the programs or the channels to an Electronic Program Guide (EPG) subsystem; and the SMS subsystem acquiring the media types supported by a terminal, mapping the acquired media types into the media type set supported by the terminal, storing the media type set supported by the terminal into a metadata field of a terminal media type set, and establishing a corresponding relationship between the media type set supported by the terminal and a user account;

wherein, the step of storing the media type set supported by the programs or the channels into a metadata field of a program channel media type set comprises:

storing the media type set supported by the programs or the channels into the metadata field of the program channel media type set by a binary mode, wherein, each binary bit represents one media type, a value as 1 represents that the program or the channel supports the media type, and a value as 0 represents that the program or the channel does not support the media type;

the step of storing the media type set supported by the terminal into a metadata field of a terminal media type set comprises:

storing the media type set supported by the terminal into the metadata field of the terminal media type set by a binary mode, wherein, each binary represents one media type, a value as 1 represents that the terminal supports the media type, and a value as 0 represents that the terminal does not support the media type.

2. The processing method according to claim 1, wherein, the step of the SMS subsystem acquiring media types supported by programs or channels and mapping the acquired media types into a media type set supported by the programs or the channels comprises:

when establishing a program or channel locally, the SMS subsystem selecting a media type supported by this program or channel, or, the SMS subsystem receiving the media type supported by the program or the channel issued by a third party; and mapping the media type supported by each program or channel as an element of the media type set when mapping the acquired media type into the media type set supported by the program or the channel.

3. The processing method according to claim 1, wherein, the step of the SMS subsystem acquiring the media types supported by a terminal and mapping the acquired media types into the media type set supported by the terminal comprises:

the SMS subsystem recording a media type supported by a terminal selected by a user when the user registers an account, or, the SMS subsystem receiving the media type supported by the terminal from a third party; and mapping the media type supported by each terminal as an element of the media type set when mapping the acquired media type into the media type set supported by the terminal.

4. A media playing method in an Internet Protocol Television (IPTV) system based on the processing method in claim 1, comprising:

after an authentication to a terminal by a service management system (SMS) subsystem is passed, the SMS subsystem returning a stored media type set supported by the terminal to an Electronic Program Guide (EPG) subsystem; and after the EPG subsystem receives a media playing request from the terminal, judging whether the media type set supported by the terminal is matched with the media type set, which is issued by the SMS subsystem, supported by the programs or channels, and if being matched, then acquiring information about a playable physical program from a database and issuing to the terminal for playing.

5. The processing method according to claim 4, further comprising:

the EPG subsystem, after receiving the media type set supported by the terminal which is returned by the SMS subsystem, storing the media type set supported by the terminal in conversation information, and storing the media type set supported by the program or the channel which is issued by the SMS subsystem in the database;

the step of the EPG subsystem acquiring the information about the playable physical program from the database and issuing to the terminal for playing comprises:

the EPG subsystem taking out the media type set supported by the terminal from the conversation information, and searching for the media type set supported by the program or the channel in the database, performing logic AND calculation to the media type set supported by the terminal and the media type set supported by the program or the channel, and then acquiring information about a playable media from the database if there is an intersection between the two, and assembling a playing address and issuing to the terminal for playing.

6. The processing method according to claim 4, wherein, the step of returning the stored media type set supported by the terminal to the EPG subsystem after the authentication to the terminal by the SMS subsystem is passed comprises:

the SMS subsystem returning the media type set supported by the terminal corresponding to a user account of the terminal to the EPG subsystem according to the user account of the terminal after the authentication to the terminal is passed.

7. A media type processing apparatus in an Internet Protocol Television (IPTV) system, comprising:

a media type set definition module, configured to: define a media type set; wherein, the media type set comprises a combination of one or more media types;

a program or channel media type processing module, configured to: acquire media types supported by programs or channels, map the acquired media types into a media type set supported by the programs or the channels, store the media type set supported by the programs or the channels into a metadata field of a program channel media type set, and issue the media type set supported by the programs or the channels to an Electronic Program Guide (EPG) subsystem; and a terminal media type processing module, configured to: acquire the media types supported by a terminal, map the acquired media types into the media type set supported by the terminal, store the media type set supported by the terminal into a metadata field of a terminal media type set, and establish a corresponding relationship between the media type set supported by the terminal and a user account;

wherein, the program or channel media type processing mode is configured to: store the media type set supported by the programs or the channels into the metadata field of the program channel media type set by a binary mode, wherein, each binary bit represents one media type, a value as 1 represents that the program or the channel supports the media type, and a value as 0 represents that the program or the channel does not support the media type;

the terminal media type processing mode is configured to: store the media type set supported by the terminal into the metadata field of the terminal media type set by a binary mode, wherein, each binary bit represents one media type, a value as 1 represents that the terminal supports the media type, and a value as 0 represents that the terminal does not support the media type.

8. The processing apparatus according to claim 7, wherein, the program or channel media type processing module is configured to acquire media types supported by programs or channels and map the acquired media types into a media type set supported by the programs or the channels by the following mode:

selecting a media type supported by a program or a channel when establishing the program or the channel locally, or, receiving the media type supported by the program or the channel issued by a third party; and mapping the media type supported by each program or channel as an element of the media type set when mapping the acquired media type into the media type set supported by the program or the channel.

9. The processing apparatus according to claim 7, wherein, the terminal media type processing module is configured to acquire the media types supported by a terminal and map the acquired media types into the media type set supported by the terminal by the following mode:

recording a media type supported by a terminal selected by a user when the user registers an account, or, receiving the media type supported by the terminal from the third party; and mapping the media type supported by each terminal as an element of the media type set when mapping the acquired media type into the media type set supported by the terminal.

10. An Electronic Program Guide (EPG) subsystem of a terminal playing media in an Internet Protocol Television (IPTV) system based on the processing apparatus in claim 8, comprising:

a terminal media type set acquiring module, configured to: after an authentication request of a terminal is received and the terminal passes an authentication by a service management system (SMS) subsystem, receive a media type set supported by the terminal which is returned by the SMS subsystem; and a playable media inquiry module, configured to: after receiving a media playing request of the terminal, judge whether the media type set supported by the terminal is matched with the media type set, which is issued by the SMS subsystem, supported by the programs or channels, and if being matched, then acquire information about a playable physical program from a database and issue to the terminal for playing.

11. The EPG subsystem according to claim 10, further comprising:

a control module, configured to: after receiving the media type set supported by the terminal which is returned by the SMS subsystem, store the media type set supported by the terminal in conversation information, and store the media type set supported by the program or the channel which is issued by the SMS subsystem in the database;

the playable media inquiry module is configured to acquire the information about the playable physical program from the database and issue to the terminal for playing by the following mode:

taking out the media type set supported by the terminal from the conversation information, and searching for the media type set supported by the program or the channel in the database, performing logic AND calculation to the media type set supported by the terminal and the media type set supported by the program or the channel, and then acquiring the information about a playable media from the database if there is an intersection between the two, and assembling a playing address and issuing to the terminal for playing.

12. A media playing method in an Internet Protocol Television (IPTV) system based on the processing method in claim 2, comprising:

after an authentication to a terminal by a service management system (SMS) subsystem is passed, the SMS subsystem returning a stored media type set supported by the terminal to an Electronic Program Guide (EPG) subsystem; and after the EPG subsystem receives a media playing request from the terminal, judging whether the media type set supported by the terminal is matched with the media type set, which is issued by the SMS subsystem, supported by the programs or channels, and if being matched, then acquiring information about a playable physical program from a database and issuing to the terminal for playing.

13. A media playing method in an Internet Protocol Television (IPTV) system based on the processing method in claim 3, comprising:

after an authentication to a terminal by a service management system (SMS) subsystem is passed, the SMS subsystem returning a stored media type set supported by the terminal to an Electronic Program Guide (EPG) subsystem; and after the EPG subsystem receives a media playing request from the terminal, judging whether the media type set supported by the terminal is matched with the media type set, which is issued by the SMS subsystem, supported by the programs or channels, and if being matched, then acquiring information about a playable physical program from a database and issuing to the terminal for playing.

14. A media playing method in an Internet Protocol Television (IPTV) system based on the processing method in claim 4, comprising:

after an authentication to a terminal by a service management system (SMS) subsystem is passed, the SMS subsystem returning a stored media type set supported by the terminal to an Electronic Program Guide (EPG) subsystem; and after the EPG subsystem receives a media playing request from the terminal, judging whether the media type set supported by the terminal is matched with the media type set, which is issued by the SMS subsystem, supported by the programs or channels, and if being matched, then acquiring information about a playable physical program from a database and issuing to the terminal for playing.

15. An Electronic Program Guide (EPG) subsystem of a terminal playing media in an Internet Protocol Television (IPTV) system based on the processing apparatus in claim 8, comprising:
- a terminal media type set acquiring module, configured to: after an authentication request of a terminal is received and the terminal passes an authentication by a service management system (SMS) subsystem, receive a media type set supported by the terminal which is returned by the SMS subsystem; and
- a playable media inquiry module, configured to: after receiving a media playing request of the terminal, judge whether the media type set supported by the terminal is matched with the media type set, which is issued by the SMS subsystem, supported by the programs or channels, and if being matched, then acquire information about a playable physical program from a database and issue to the terminal for playing.

16. An Electronic Program Guide (EPG) subsystem of a terminal playing media in an Internet Protocol Television (IPTV) system based on the processing apparatus in claim 9, comprising:
- a terminal media type set acquiring module, configured to: after an authentication request of a terminal is received and the terminal passes an authentication by a service management system (SMS) subsystem, receive a media type set supported by the terminal which is returned by the SMS subsystem; and
- a playable media inquiry module, configured to: after receiving a media playing request of the terminal, judge whether the media type set supported by the terminal is matched with the media type set, which is issued by the SMS subsystem, supported by the programs or channels, and if being matched, then acquire information about a playable physical program from a database and issue to the terminal for playing.

\* \* \* \* \*